(12) United States Patent
Yeh et al.

(10) Patent No.: US 8,001,317 B2
(45) Date of Patent: Aug. 16, 2011

(54) DATA WRITING METHOD FOR NON-VOLATILE MEMORY AND CONTROLLER USING THE SAME

(75) Inventors: Chih-Kang Yeh, Kinmen County (TW);
Chien-Hua Chu, Hsinchu County (TW);
Jia-Yi Fu, Miaoli (TW)

(73) Assignee: Phison Electronics Corp., Miaoli (TW)

( * ) Notice: Subject to any disclaimer, the term of this patent is extended or adjusted under 35 U.S.C. 154(b) by 683 days.

(21) Appl. No.: 12/025,485

(22) Filed: Feb. 4, 2008

(65) Prior Publication Data

US 2009/0106484 A1 Apr. 23, 2009

(30) Foreign Application Priority Data

Oct. 19, 2007 (TW) ................................ 96139304 A

(51) Int. Cl.
*G06F 12/00* (2006.01)
*G06F 13/00* (2006.01)
*G06F 13/28* (2006.01)

(52) U.S. Cl. ........................................ 711/103; 711/173
(58) Field of Classification Search .................. 711/103, 711/173
See application file for complete search history.

(56) References Cited

U.S. PATENT DOCUMENTS

| | | | |
|---|---|---|---|
| 2006/0155921 A1 | 7/2006 | Gorobets et al. | 711/103 |
| 2008/0002467 A1* | 1/2008 | Tsuji | 365/185.11 |
| 2008/0098192 A1* | 4/2008 | Im et al. | 711/170 |
| 2008/0313505 A1* | 12/2008 | Lee et al. | 714/47 |

OTHER PUBLICATIONS

Chinese Examination Report of Taiwan Application No. 096139304, dated Apr. 18, 2011.

* cited by examiner

*Primary Examiner* — Kevin L Ellis
*Assistant Examiner* — Ryan Bertram
(74) *Attorney, Agent, or Firm* — J.C. Patents

(57) ABSTRACT

A data writing method for a non-volatile memory is provided, wherein the non-volatile memory includes a data area and a spare area. In the data writing method, a plurality of blocks in a substitution area of the non-volatile memory is respectively used for substituting a plurality of blocks in the data area, wherein data to be written into the blocks in the data area is written into the blocks in the substitution area, and the blocks in the substitution area are selected from the spare area of the non-volatile memory. A plurality of temporary blocks of the non-volatile memory is used as a temporary area of the blocks in the substitution area, wherein the temporary area is used for temporarily storing the data to be written into the blocks in the substitution area.

12 Claims, 9 Drawing Sheets

| LOWER PAGE | UPPER PAGE | LOWER PAGE | UPPER PAGE | LOWER PAGE | UPPER PAGE | LOWER PAGE | UPPER PAGE |
|---|---|---|---|---|---|---|---|
| 0 | 1 | 32 | 33 | 64 | 65 | 96 | 97 |
| 2 | 3 | 34 | 35 | 66 | 67 | 98 | 99 |
| 4 | 5 | 36 | 37 | 68 | 69 | 100 | 101 |
| 6 | 7 | 38 | 39 | 70 | 71 | 102 | 101 |
| 8 | 9 | 40 | 41 | 72 | 73 | 104 | 105 |
| 10 | 11 | 42 | 43 | 74 | 75 | 106 | 107 |
| 12 | 13 | 44 | 45 | 76 | 77 | 108 | 109 |
| 14 | 15 | 46 | 47 | 78 | 79 | 110 | 111 |
| 16 | 17 | 48 | 49 | 80 | 81 | 112 | 113 |
| 18 | 19 | 50 | 51 | 82 | 83 | 114 | 115 |
| 20 | 21 | 52 | 53 | 84 | 85 | 116 | 117 |
| 22 | 23 | 54 | 55 | 86 | 87 | 118 | 119 |
| 24 | 25 | 56 | 57 | 88 | 89 | 120 | 121 |
| 26 | 27 | 58 | 59 | 90 | 91 | 122 | 123 |
| 28 | 29 | 60 | 61 | 92 | 93 | 124 | 125 |
| 30 | 31 | 62 | 63 | 94 | 95 | 126 | 127 |

DATA WRITING METHOD FOR NON-VOLATILE MEMORY AND CONTROLLER USING THE SAME

CROSS-REFERENCE TO RELATED APPLICATION

This application claims the priority benefit of Taiwan application serial no. 96139304, filed on Oct. 19, 2007. The entirety of the above-mentioned patent application is hereby incorporated by reference herein and made a part of this specification.

BACKGROUND OF THE INVENTION

1. Field of the Invention

The present invention generally relates to a data writing method, in particular, to a data writing method for a non-volatile memory and a controller using the same.

2. Description of Related Art

Along with the widespread of digital cameras, camera phones, and MP3 in recently years, the consumers' demand to storage media has increased drastically too. Flash memory is one of the most adaptable memories for such battery-powered portable products due to its characteristics such as data non-volatility, low power consumption, small volume, and non-mechanical structure. Besides being applied in foregoing portable products, flash memory is also broadly applied to external products such as flash cards and flash drives, and an even larger market is provided since one can have more than one flash card and flash drive. Thereby, flash memory has become one of the most focused electronic products in recent years.

FIGS. 1A~1D are detailed block diagrams illustrating a conventional non-volatile memory 100 and the operation thereof.

Referring to FIG. 1A, in the present example, in order to program (i.e. write or erase) the non-volatile memory 100 efficiently, blocks in the non-volatile memory 100 are logically grouped into a system area 102, a data area 104, and a spare area 106. Generally speaking, more than 90% of the blocks in the non-volatile memory 100 belong to the data area 104.

Blocks in the system area 102 are used for storing system data, such as the number of zones in the non-volatile memory 100, the number of blocks in each zone, the number of pages in each block, and a logical-physical mapping table etc.

Blocks in the data area 104 are used for storing user data. Generally speaking, these blocks are corresponding to the logical block addresses (LBAs) operated by a host (not shown).

Blocks in the spare area 106 are used for substituting blocks in the data area 104. Thus, the blocks in the spare area 106 are empty blocks, namely, no data is recorded in these blocks or data recorded in these blocks has been marked as invalid data. To be specific, an erase operation has to be performed before writing data into a position in which data has been recorded before. However, data is written into a flash memory in unit of pages while erased from the same in unit of blocks. Since an erase unit is larger than a write unit, those valid pages in a block have to be copied to another block before data is erased from this block. Accordingly, to write new data into a block M in the data area 104, a block S is first selected from the spare area 106. The valid data previously stored in the block M is copied to the block S, and the new data is also written into the block S. After that, the block M is erased and linked to the spare area 106, and meanwhile, the block S is linked to the data area 104 (as shown in FIG. 1A).

Generally, in order to use the non-volatile memory 100 more efficiently, blocks in the non-volatile memory 100 are further logically grouped into a substitute block 108 and a temporary block 110.

Referring to FIG. 1B, the substitute block 108 is used for substituting a block to be written in the data area 104. To be specific, when a block (for example, a block C) is selected from the spare area 106 for substituting a block (for example, the block M) in the data area 104, the new data is written into the block C, but the valid data in the block M is not copied to the block C instantly in order to erase the block M. This is because the valid data in the block M may become invalid in the next operation, so that moving the valid data in the block M instantly to the block C may become meaningless. Thus, in the present example, the block C containing the new data is temporarily linked as a substitute block, and the fact that multiple physical block addresses (PBAs) are mapped to one LBA is recorded. Namely, the combination of contents in the block M and the block C is the content of the corresponding logical block. As described above, the blocks in the non-volatile memory can be used more efficiently. Thereafter, two methods are usually used for combining the contents of the block M and the block C. According to the first method, the valid data in the block M is first copied to the block C, and then the block M is erased and linked to the spare area 106 and the block C is linked to the data area 104 (as shown in FIG. 1B). According to the other method, a blank block S is first selected from the spare area 106, and the valid data in both block M and block C are copied into the block S. After that, the block M and the block C are both erased and linked to the spare area 106, and the block S is linked to the data area 104 (as shown in FIG. 1C).

The function of the temporary block 110 is similar to that of the substitute block 108. When the non-volatile memory is a multi level cell (MLC) NAND flash memory, each page in the MLC NAND flash memory contains four sectors, namely, each page has four sectors of 512 bytes, which is 2048 bytes in total. As described above, data is written into a flash memory in unit of pages. Accordingly, four sectors have to be programmed each time when data is written into the MLC NAND flash memory, so that the memory space may be wasted when the data to be written is less than one page. The temporary block 110 is used for temporarily storing such data of small quantity. To be specific, if the data to be written into the substitute block 108 (for example, a block C) is less than one page, a block T is selected from the spare area 106 and the data is written into the block T. The block T is then linked to the temporary block 110. When subsequently the data to be written into the memory is enough for one page, the data is then written into the block C, and the block T is erased and linked to the spare area 106 (as shown in FIG. 1D).

Due to the physical characteristics of a flash memory, a block in the flash memory has to be erased every time before new data is written into the block. However, the block may still contain some valid data so that the valid data has to be moved away (or copied) before the block is erased. Accordingly, along with the development of flash memory and the increase in the storage capacity of each block, the data to be moved is getting more and more, and which may reduce the performance of the entire system.

Additionally, due to the physical characteristics of MLC NAND flash memory, charges in some pages of a MLC NAND flash memory are not very stable and which may even affect adjacent pages. Thus, even though the MLC NAND flash memory offers high storage capacity, the reliability thereof is not satisfactory.

To resolve foregoing programs, a data writing method which can improve the access efficiency and data reliability of a flash memory is needed.

SUMMARY OF THE INVENTION

Accordingly, the present invention is directed to a data writing method for a non-volatile memory. The data writing method can effectively improve the access efficiency and data reliability of a flash memory.

The present invention is directed to a controller which executes a data writing procedure for a non-volatile memory, wherein the data writing procedure can effectively improve the access efficiency and data reliability of a flash memory.

The present invention provides a data writing method for a non-volatile memory. In the data writing method, a plurality of blocks in a substitution area of the non-volatile memory is respectively used for substituting a plurality of blocks in a data area of the non-volatile memory, wherein data to be written into the blocks in the data area is written into the blocks in the substitution area, and the blocks in the substitution area are selected from a spare area of the non-volatile memory. A plurality of temporary blocks of the non-volatile memory is used as a temporary area of the blocks in the substitution area, wherein the temporary area is used for temporarily storing the data to be written into the blocks in the substitution area.

According to an embodiment of the present invention, the non-volatile memory further includes a replacement area, and at least one of the temporary blocks is selected from the replacement area.

According to an embodiment of the present invention, when the blocks in the substitution area are attached right after where data is previously recorded for recording continuous write-back data, the related data is written into the temporary area.

According to an embodiment of the present invention, the data writing method further includes using a temporary table for indicating valid data and invalid data in the temporary area and the mappings between pages in the temporary area and pages in the blocks in the substitution area.

According to an embodiment of the present invention, if the flash memory is a MLC NAND flash memory, only lower pages in the temporary blocks are used for writing data into the temporary area, wherein the write speed of the lower pages is faster than that of the upper pages in the temporary blocks.

According to an embodiment of the present invention, if the flash memory is a MLC NAND flash memory, only the pages having the fastest write speed or highest reliability in the temporary blocks are used for writing data into the temporary area.

The present invention provides a data writing method for a non-volatile memory, wherein the non-volatile memory is a MLC NAND flash memory, and each block in the non-volatile memory includes upper pages and lower pages. The data writing method includes using only one of the upper page and the lower page for writing data in some blocks of the non-volatile memory, wherein the write speed of the lower pages is faster than that of the upper pages.

According to an embodiment of the present invention, the data writing method further includes using only the lower pages of each block for writing data.

According to an embodiment of the present invention, the data includes at least one of a logical-physical mapping table, a cache file, a file allocation table (FAT), a firmware code, a defect block table (DBT) for recording defective blocks, a replace unit table (RUT) for managing defective block replacement, an info block for storing firmware parameters, and a variable table (VT) for storing variables.

According to an embodiment of the present invention, the data writing method further includes establishing a page query table for recording the physical addresses of the lower pages.

According to an embodiment of the present invention, the data writing method further includes establishing a logic conversion formula for calculating the physical addresses of the lower pages.

According to an embodiment of the present invention, foregoing some blocks are a plurality of temporary blocks, and these temporary blocks are used as a temporary area of a plurality of blocks in a substitution area.

The present invention provides a controller including a non-volatile memory interface, a buffer memory, a microprocessor unit, and a memory management module. The microprocessor unit is used for controlling the operation of the controller. The non-volatile memory interface is electrically connected to the microprocessor unit and used for accessing the non-volatile memory. The buffer memory is electrically connected to the microprocessor unit and used for temporarily storing data. The memory management module is electrically connected to the microprocessor unit and used for managing the non-volatile memory, wherein the memory management module respectively uses a plurality of blocks in a substitution area of the non-volatile memory for substituting a plurality of blocks in a data area of the non-volatile memory, wherein data to be written into the blocks in the data area is written into the blocks in the substitution area, and the blocks in the substitution area are selected from a spare area of the non-volatile memory, and the memory management module uses a plurality of temporary blocks of the non-volatile memory as a temporary area of the blocks in the substitution area, wherein the temporary area is used for temporarily storing data to be written into the blocks in the substitution area.

According to an embodiment of the present invention, the non-volatile memory further includes a replacement area, wherein at least one of the temporary blocks is selected from the replacement area.

According to an embodiment of the present invention, the memory management module uses a temporary table for indicating valid data and invalid data in the temporary area and the mappings between pages in the temporary area and pages in the blocks in the substitution area.

According to an embodiment of the present invention, when the blocks in the substitution area are attached right after where data is previously recorded for recording continuous write-back data, the related data is written into the temporary area.

According to an embodiment of the present invention, the non-volatile memory is a SLC NAND flash memory or a MLC NAND flash memory.

According to an embodiment of the present invention, if the flash memory is the MLC NAND flash memory, the memory management module only uses lower pages in the temporary blocks for writing data into the temporary area, wherein the write speed of the lower pages is faster than that of the upper pages in the temporary blocks.

The present invention provides a controller suitable for a storage device, wherein a non-volatile memory of the storage device is a MLC NAND flash memory, and each block in the non-volatile memory includes upper pages and lower pages. The controller includes a non-volatile memory interface, a buffer memory, a microprocessor unit, and a memory management module. The microprocessor unit is used for controlling the operation of the controller. The non-volatile memory interface is electrically connected to the microprocessor unit and used for accessing the non-volatile memory. The buffer memory is electrically connected to the microprocessor unit and used for temporarily storing data. The memory management module is electrically connected to the microprocessor unit and used for managing the non-volatile memory, wherein the memory management module only uses the lower pages for writing data in a part of the blocks, wherein the write speed of the lower pages is faster than the write speed of the upper pages.

According to an embodiment of the present invention, wherein the memory management module uses only the lower pages in each block for writing data.

According to an embodiment of the present invention, the data includes at least one of a logical-physical mapping table, a cache file, a FAT, a firmware code, a DBT for recording defective blocks, a RUT for managing defective block replacement, an info block for storing firmware parameters, and a VT for storing variables.

According to an embodiment of the present invention, wherein the memory management module establishes a page query table for recording the physical addresses of the lower pages.

According to an embodiment of the present invention, wherein the memory management module establishes a logic conversion formula for calculating the physical addresses of the lower pages.

According to an embodiment of the present invention, foregoing some blocks are a plurality of temporary blocks, and these temporary blocks are used as a temporary area of a plurality of blocks in a substitution area.

The present invention provides a controller suitable for a storage device, wherein a non-volatile memory of the storage device is a MLC NAND flash memory, and each block in the non-volatile memory includes pages having at least two different write speeds. The controller includes a non-volatile memory interface, a buffer memory, a microprocessor unit, and a memory management module. The microprocessor unit is used for controlling the operation of the controller. The non-volatile memory interface is electrically connected to the microprocessor unit and used for accessing the non-volatile memory. The buffer memory is electrically connected to the microprocessor unit and used for temporarily storing data. The memory management module is electrically connected to the microprocessor unit and used for managing the non-volatile memory, wherein the memory management module uses only the pages having the fastest write speed for writing data in at least one of the blocks.

The present invention provides a data writing method for a non-volatile memory, wherein an integrated temporary area is used for temporarily storing data so that frequent data moving and erasing actions can be avoided and accordingly the efficiency in programming the non-volatile memory can be effectively improved. Moreover, data reliability of the non-volatile memory can be effectively improved by using only lower pages in a block for storing data.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 illustrates an example of physical addresses of pages in a MLC NAND flash memory.

DESCRIPTION OF THE EMBODIMENTS

Figure 1A:
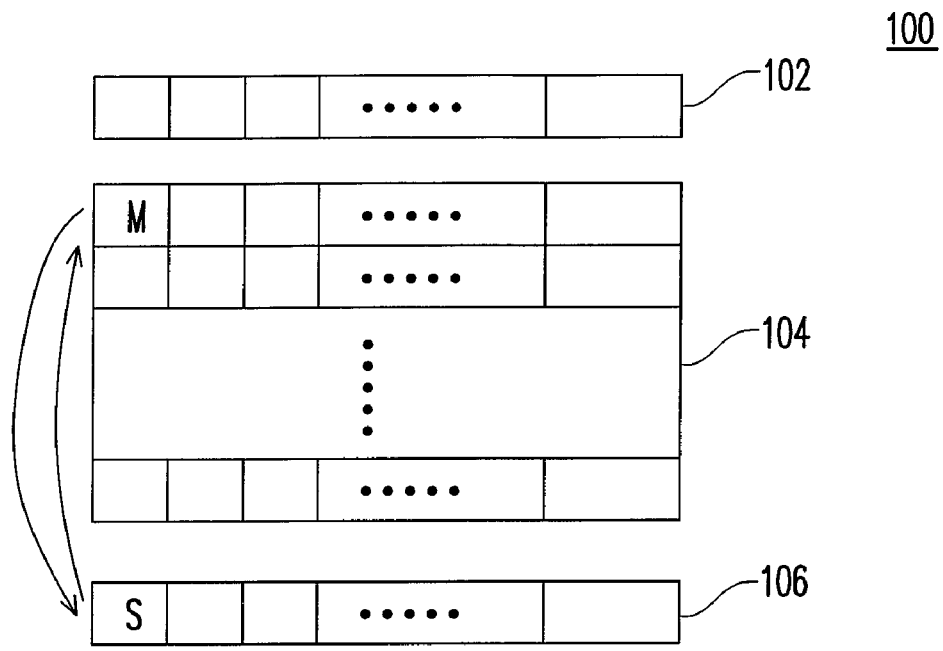
FIGS. 1A~1D are detailed block diagrams of a conventional non-volatile memory and the operation thereof.
Figure 1B:
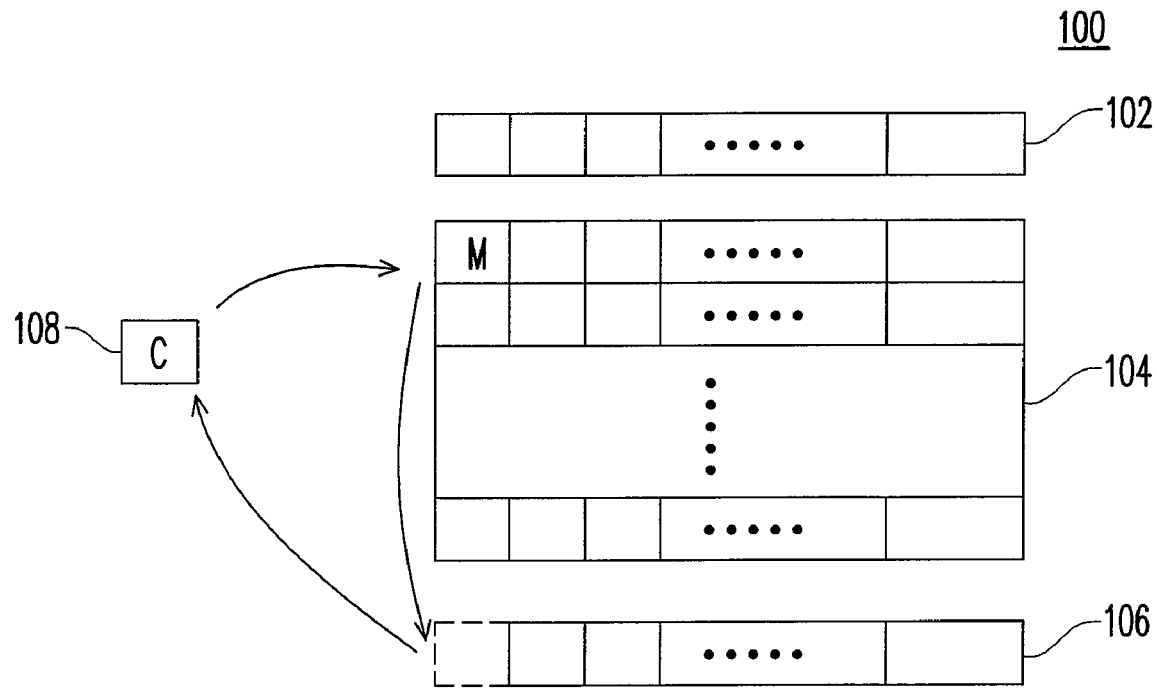

Reference will now be made in detail to the present preferred embodiments of the invention, examples of which are illustrated in the accompanying drawings. Wherever possible, the same reference numbers are used in the drawings and the description to refer to the same or like parts.

It has to be understood that in following descriptions, terms like "select", "move", and "exchange" are only used for referring to the logical operations performed to blocks in a flash memory. In other words, the physical locations of the blocks in the flash memory are not changed and these operations are only performed to these blocks logically.

A non-volatile memory storage system usually includes a non-volatile memory and a controller (control IC). A non-volatile memory storage system is usually used together with a host system so that the host system can write data into the non-volatile memory storage system or read data from the same. In addition, a non-volatile memory storage system may also include an embedded non-volatile memory and software which can be executed by a host system to substantially serve as a controller of the embedded non-volatile memory.

Figure 2A:
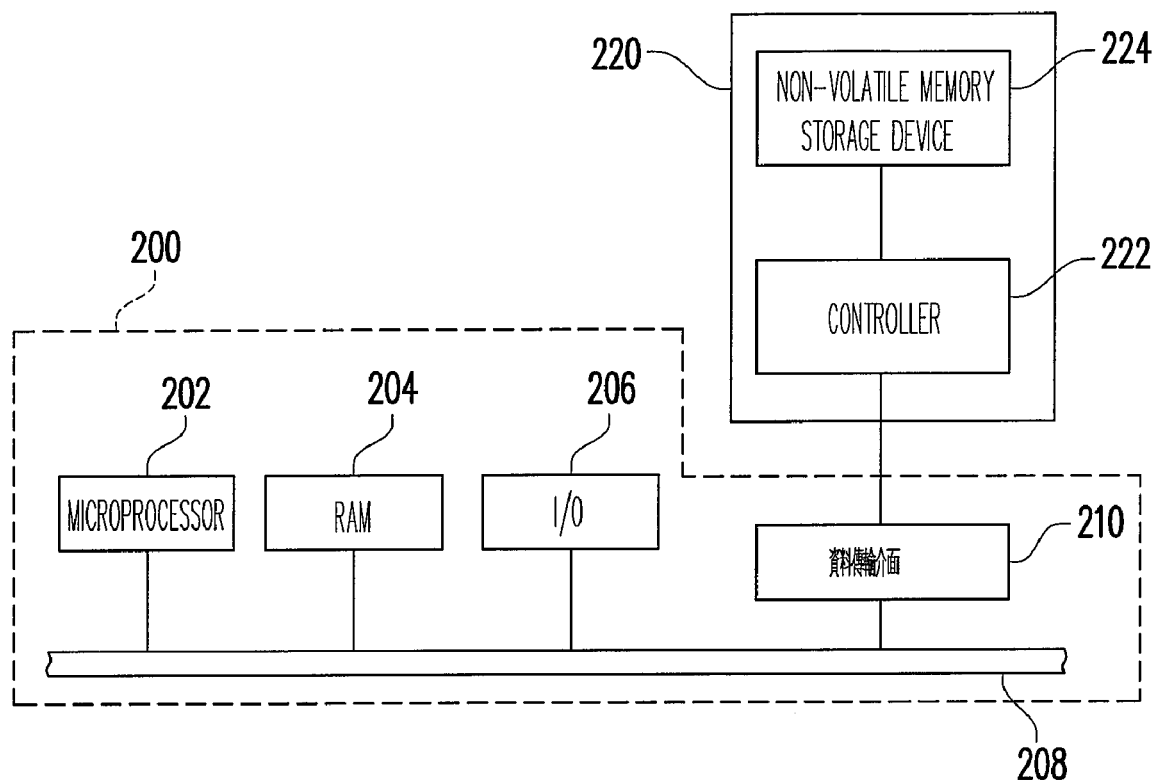
FIG. 2A illustrates a host accessing a non-volatile memory storage device according to an embodiment of the present invention.

FIG. 2A illustrates a host accessing a non-volatile memory storage device according to an embodiment of the present invention.

Referring to FIG. 2A, the host 200 includes a microprocessor 202, a random access memory (RAM) 204, an input/output (I/O) device 206, a system bus 208, and a data transmission interface 210. It should be noted that the host 200 may further include other components, such as a display or a network device.

The host 200 may be a computer, a digital camera, a video camera, a communication device, an audio player, or a video player. Generally speaking, the host 200 can be any system which can store data.

In the present embodiment, the non-volatile memory storage device 220 is electrically connected to other components of the host 200 via the data transmission interface 210. Data can be written into or read from the non-volatile memory storage device 220 through the microprocessor 202, the RAM 204, and the I/O device 206. The non-volatile memory storage device 120 may be a flash drive, a memory card, or a solid state drive (SSD).

Figure 2B:
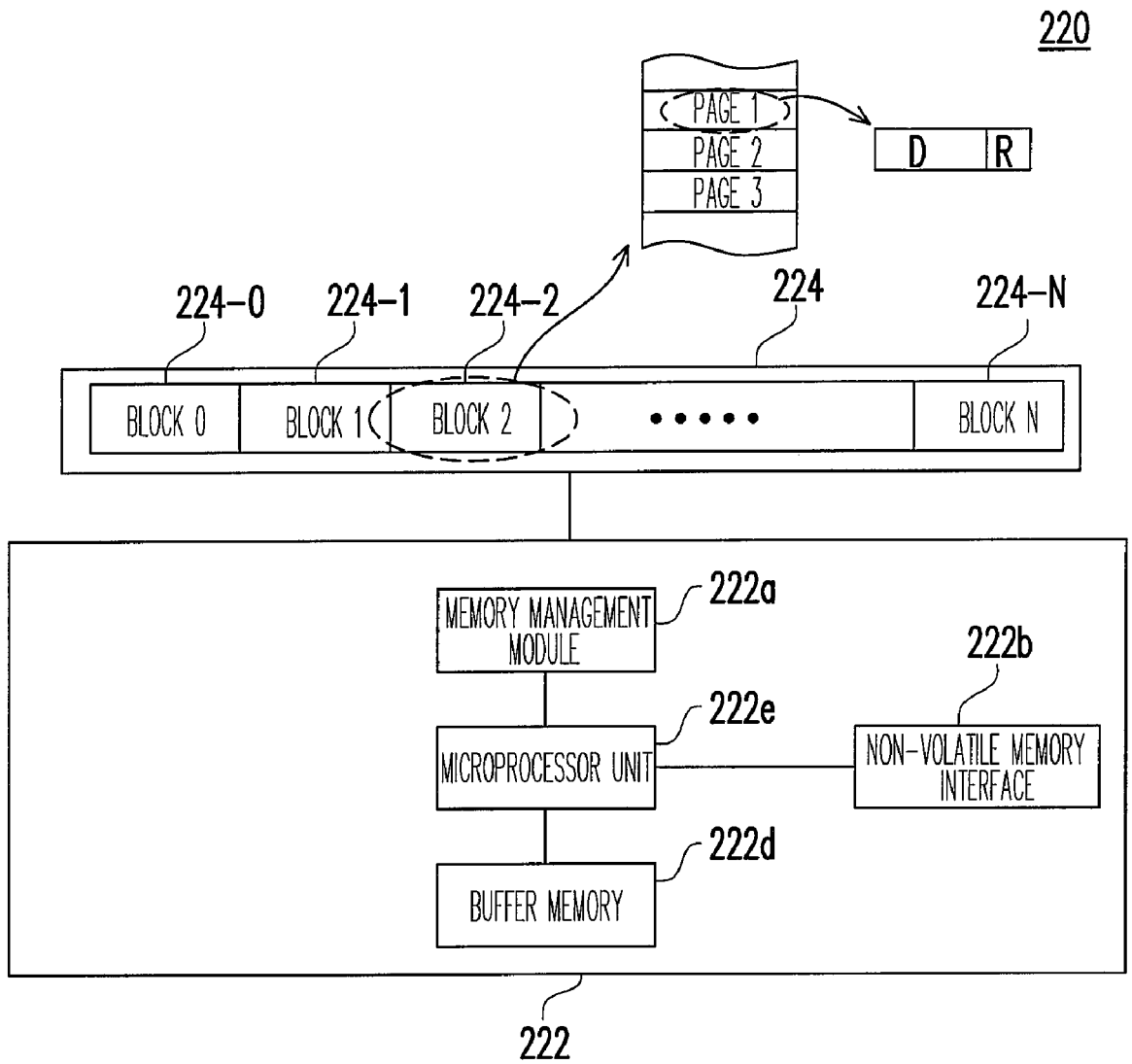
FIG. 2B is a detailed block diagram of the non-volatile memory storage device in FIG. 2A.

FIG. 2B is a detailed block diagram of the non-volatile memory storage device in FIG. 2A.

Referring to FIG. 2B, the non-volatile memory storage device 220 includes a controller 222 and a non-volatile memory 224.

The controller 222 is used for controlling the operation of the non-volatile memory storage device 220, such as data storage, data reading, and data erasing etc. The controller 222 includes a memory management module 222*a*, a non-volatile memory interface 222*b*, a buffer memory 222*d*, and a microprocessor unit 222*e*.

Figure 4:
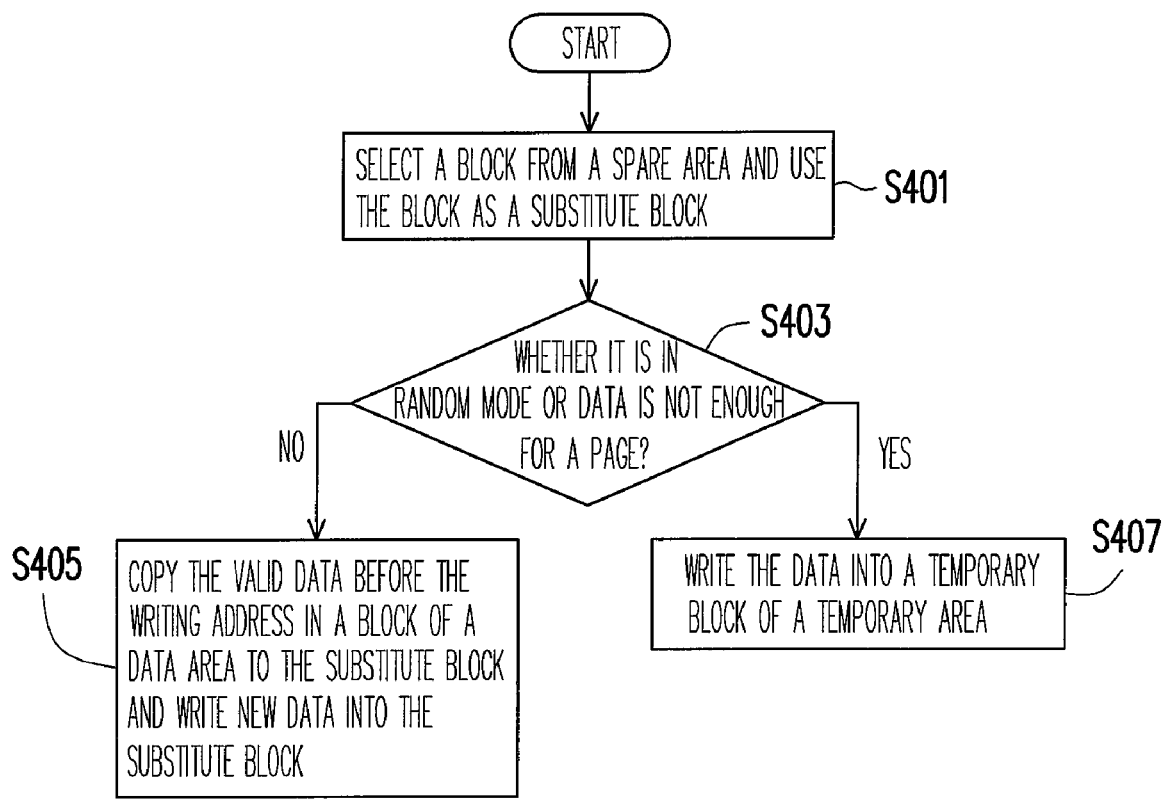
FIG. 4 is a flowchart of a data writing method for a non-volatile memory according to an embodiment of the present invention.

The memory management module 222*a* is electrically connected to the microprocessor 222*e* and used for managing the non-volatile memory 224, for example, for executing a wear leveling function, managing bad blocks, and maintaining a mapping table etc. In particular, the memory management module 222*a* performs a data writing procedure according to the present embodiment (as shown in FIG. 4).

The non-volatile memory interface 222*b* is electrically connected to the microprocessor 222*e* and used for accessing the non-volatile memory 224, namely, data to be written into the non-volatile memory 224 by the host 200 is converted by the non-volatile memory interface 222*b* into a format which is acceptable to the non-volatile memory 224.

The buffer memory 222*d* is electrically connected to the microprocessor 222*e* and used for temporarily storing system data (for example, a mapping table) or data to be read or written by the host. In the present embodiment, the buffer memory 222*d* is a static random access memory (SRAM). However, the present invention is not limited thereto, and the buffer memory 222*d* may also be a dynamic random access memory (DRAM), a magnetoresistive random access memory (MRAM), a phase change random access memory (PCRAM), or other suitable memories.

The microprocessor unit 222*e* is used for controlling the operation of the controller 222.

Figure 2C:
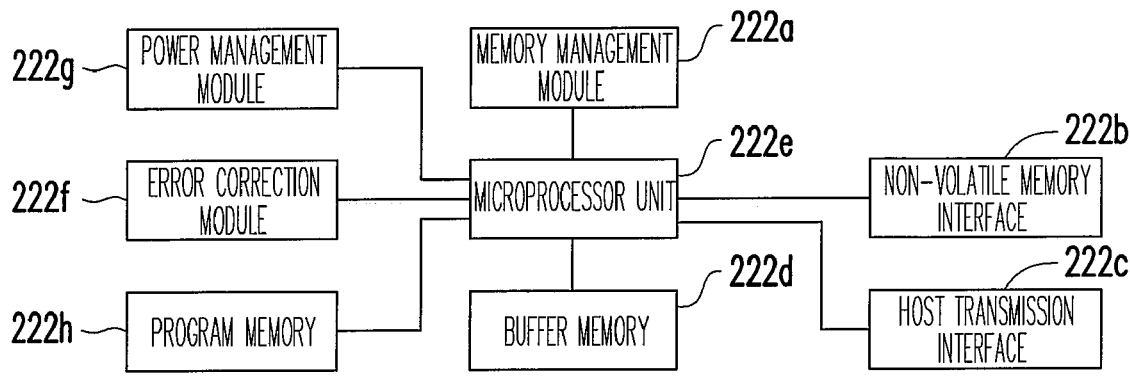
FIG. 2C is a detailed block diagram of a controller according to an embodiment of the present invention.

In another embodiment of the present invention, the controller further includes a host transmission interface 222*c*, a program memory 222*h*, an error correction module 222*f*, and a power management module 222*g* (as the controller 222' illustrated in FIG. 2C).

The host transmission interface 222*c* is electrically connected to the microprocessor 222*e* and used for communicating with the host 200. The host transmission interface 222*c* may be an USB interface, an IEEE 1394 interface, a SATA interface, a PCI Express interface, a SAS interface, a MS interface, a MMC interface, a SD interface, a CF interface, or an IDE interface.

The program memory 222*h* is electrically connected to the microprocessor 222*e* and used for storing control program codes.

The error correction module 222*f* is electrically connected to the microprocessor 222*e* and used for calculating an error correcting code (ECC code) for checking and correcting the data to be read or written by the host.

The power management module 222*g* is electrically connected to the microprocessor 222*e* and used for managing the power supply of the non-volatile memory storage device 220.

The non-volatile memory 224 is electrically connected to the controller 222 and used for storing data. In the present embodiment, the non-volatile memory 224 is a flash memory. To be specific, the non-volatile memory 224 is a multi level cell (MLC) NAND flash memory. However, the present invention is not limited thereto, and the non-volatile memory 224 may also be a single level cell (SLC) NAND flash memory.

The non-volatile memory 224 is substantially divided into a plurality of physical blocks 224-0~224-N, and for the convenience of description, these physical blocks will be referred as blocks thereinafter. Generally speaking, data in a flash memory is erased in unit of blocks. In other words, each block contains the smallest number of memory cells which are erased together. Each block is usually divided into a plurality of pages. A page is the smallest programming unit. However, it has to be noted that the smallest programming unit may also be a sector in some other flash memory designs, namely, a page is further divided into a plurality of sectors and each sector is the smallest programming unit. In other words, a page is the smallest unit for writing or reading data. A page usually includes a user data area D and a redundant area R, wherein the user data area is used for storing user data, and the redundant area is used for storing system data (for example, ECC code).

Generally, the user data area D has 512 bytes and the redundant area R has 16 bytes in order to correspond to the size of a sector in a disk driver. Namely, a page is a sector. However, a page may also be composed of more than one sector. For example, a page may include four sectors. Generally speaking, a block may contain any number of pages, for example, 64 pages, 128 pages, and 256 pages etc. The blocks 224-0~224-N are usually grouped into a plurality of zones. By managing the operations of a memory by zones, operation parallelism can be increased and operation management can be simplified.

Figure 3:
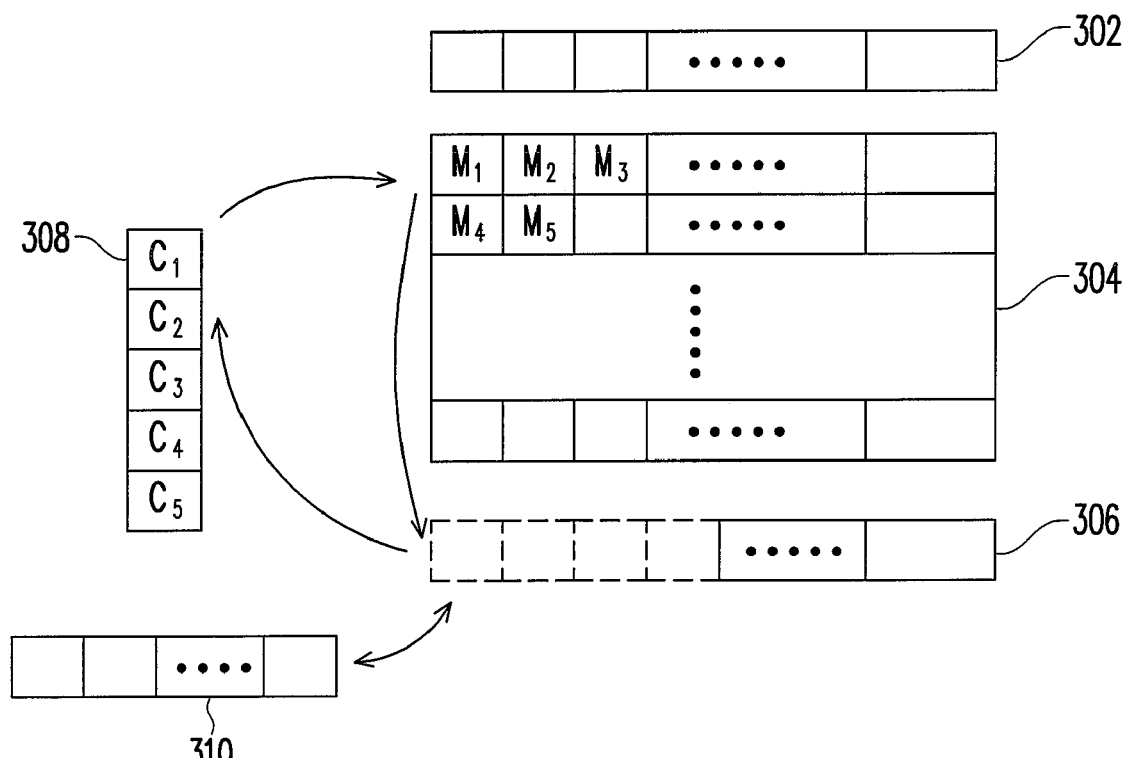
FIG. 3 is a detailed block diagram of a non-volatile memory and the operation thereof according to an embodiment of the present invention.

FIG. 3 is a detailed block diagram of the non-volatile memory 224 and the operation thereof according to an embodiment of the present invention.

Referring to FIG. 3, the configuration and the operation of the non-volatile memory 224 are similar to those illustrated in FIGS. 1A~1D. The blocks 224-1~224-N of the non-volatile memory 224 are logically grouped into a system area 302, a data area 304, and a spare area 306. Generally speaking, more than 90% of the blocks in the non-volatile memory 224 belong to the data area 304.

Blocks in the system area 302 are used for recording system data, such as the number of zones in the non-volatile memory 224, the number of blocks in each zone, the number of pages in each block, and a logical-physical mapping table etc. Blocks in the data area 304 are used for storing user data. Generally speaking, these blocks are corresponding to the logical block addresses (LBAs) operated by the host 200. Blocks in the spare area 306 are used for substituting the blocks in the data area 304. The operation of the non-volatile memory 224 is the same as that illustrated in FIGS. 1A~1C therefore will not be described herein.

Figure 1C:
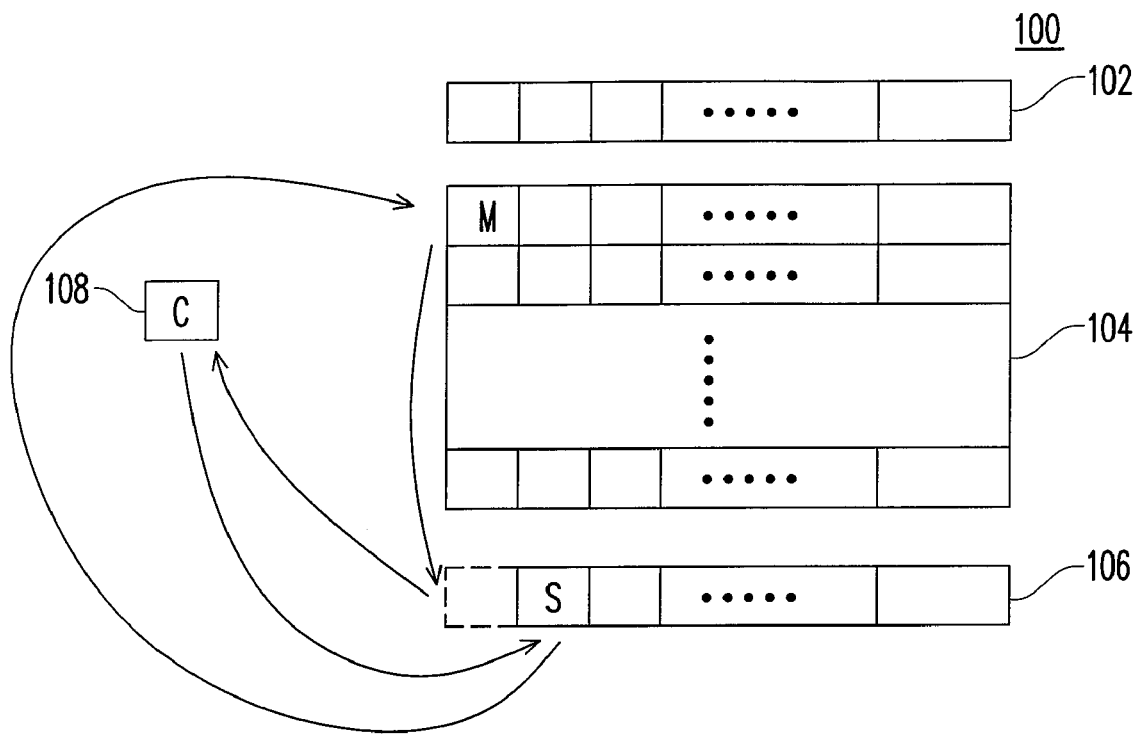
Figure 1D:
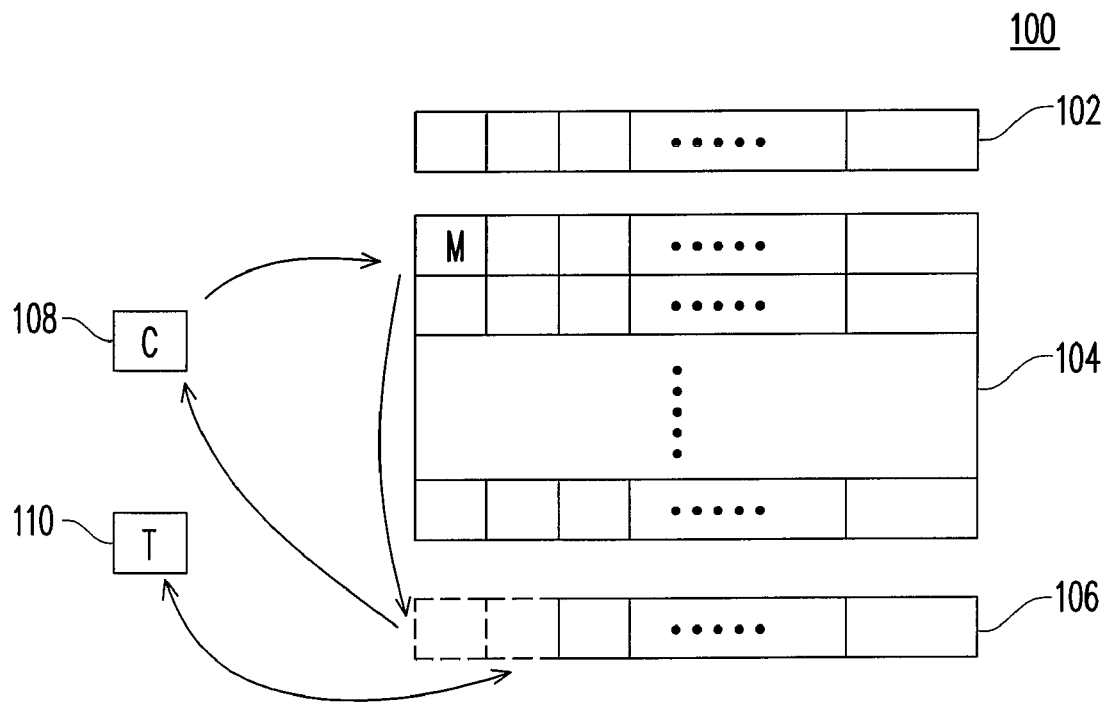

In the present embodiment, the non-volatile memory 224 further includes a substitution area 308. The substitution area 308 is used for temporarily storing blocks to be used for substituting the blocks in the data area 304, namely, the substitute block 108 as shown in FIG. 1C or FIG. 1D. Generally speaking, such mother-child relationship between blocks (i.e. the mapping respectively between blocks M1~M5 and blocks C1~C5) can be determined according to the size of the buffer memory. The present embodiment is implemented with five sets of blocks having such mapping relationship; however, the present invention is not limited thereto.

In the present embodiment, the non-volatile memory 224 further includes a temporary area 310. As the temporary block 110 in the conventional technique, the temporary area 310 is also used for temporarily storing data of small quantity. The difference between the temporary area 310 and the temporary block 110 is that the temporary block 110 only belongs to one set of mother-child blocks. In other words, in the conventional technique, the block T (as shown in FIG. 1D) is operated independently so as to be used in a particular set of mother-child blocks. However, in the present embodiment, the temporary area 310 composed of a plurality of blocks is used as a temporary area for five sets of mother-child blocks for temporarily storing data. For example, the blocks C1, C2, C3, C4, and C5 in the substitution area 308 are respectively corresponding to the blocks M1, M2, M3, M4, and M5 in the data area 304 which are to be substituted, and the temporary area 310 is used as a temporary area of the blocks C1~C5 in the substitution area 308.

It should be mentioned here that a file allocation table (FAT) is usually used in a storage device for managing the storage media in the storage device, wherein the data stored in the FAT is accessed frequently and each time only a small amount of data is accessed. Thus, the data stored in the FAT is accessed in a random mode. To be specific, when the blocks in the substitution area 308 (i.e. blocks C1~C5) are attached right after where data is previously recorded in a random mode for recording continuous write-back data, the related data is written into the temporary area 310, and a temporary table is used for managing the validity and related links of the data. In the present embodiment, the ever-changing FAT data is also stored in the temporary area 310 but not in the blocks in the substitution area 308 so that the data will not become invalid after being written repeatedly. Similarly, in the present embodiment, the temporary table is used for indicating valid and invalid data in the temporary area 310 and a mapping relationship between pages in the temporary area 310 and pages in the blocks of the substitution area 308.

The present embodiment is implemented with five sets of mother-child blocks. However, the present invention is not limited thereto.

It should be mentioned that the logical mappings between foregoing blocks are updated continuously in the buffer memory 222d during the operation of the non-volatile memory storage device, and, for example, this information may be recorded into the blocks in the system area 302 after the non-volatile memory storage device completes the operation or has performed a particular number of operations.

FIG. 4 is a flowchart of a data writing method for a non-volatile memory according to an embodiment of the present invention.

Referring to FIG. 4, in step S401, when a data is to be written into a block in the data area 304, a block is selected from the spare area 306 and linked to the substitution area 308. In step S403, whether it is in random mode or whether the data to be written is not enough for a page is determined. If it is determined that it is not in random mode and the data is enough for a page in step S403, in step S405, the valid data in the block of the data area 304 before the writing address is copied to the block selected and linked to the substitution area 308, and the new data is also written into this block. If it is determined that it is in random mode or the data is not enough for a page in step S403, the data is written into a temporary block in the temporary area 310 (step S407).

It should be mentioned that the memory management module 222a determines a time for integrating the data written into the temporary area 310 into a page or a block so as to replace the block in the substitution area 308 or the data area 304. The technique for determining the integration time is an existing technique therefore will not be described herein.

Generally speaking, the non-volatile memory 224 further includes a replacement area (not shown) besides the system area 302, the data area 304, and the spare area 306, wherein the replacement area contains blocks which are not used in the non-volatile memory 224. When a normal block (for example, a block in the system area 302, the data area 304, or the spare area 306) in the non-volatile memory storage device 220 is damaged (for example, by a bad process or frequent erasing), a block can be selected from the replacement area for replacing the damaged block. In the present embodiment, the temporary blocks in the temporary area 310 may also be selected from the replacement area. There are many advantages by using the blocks in the replacement area as the temporary area 310. For example, the blocks in the replacement area are usually not used so by using the blocks in the replacement area as the temporary area 310, the non-volatile memory 224 can be used more efficiently. Besides, if a damaged block in the non-volatile memory storage device 220 is to be replaced and a block in the replacement area is selected and used for replacing the damaged block, since this block has been used before, the situation that the erased times of this block is very different from the erased times of other blocks in the system is avoided, namely, the blocks can have even erased times.

In the present embodiment, in step S407, a temporary table is further used for indicating the valid and invalid data in the temporary area 310 and a mapping relationship between pages in the temporary area 310 and pages in the blocks in the substitution area 308.

Figure 5A:
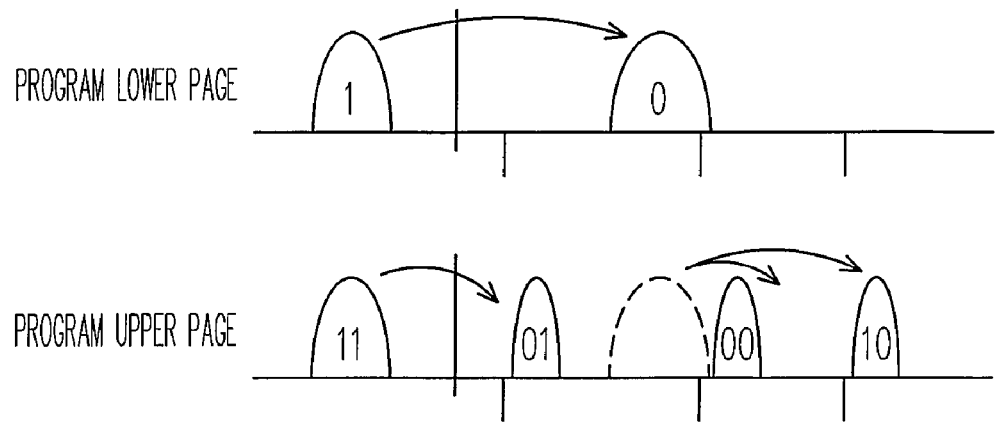
FIG. 5A illustrates a writing operation of a multi level cell (MLC) NAND flash memory.

It should be mentioned that the non-volatile memory can be programmed in multiple phases if the non-volatile memory is a MLC NAND flash memory. Taking a memory having 4-level memory cells as an example, the memory can be programmed in two phases. As shown in FIG. 5A, lower pages (having similar physical characteristics as a SLC NAND flash memory) are programmed during the first phase, and after that upper pages are programmed. In particular, the upper pages and the lower pages have a coupling relationship. In other words, any abnormality produced while programming the upper pages may cause instability of the lower pages (i.e. data may be lost). Accordingly, in a memory having 8-level or 16-level memory cells, more pages are included so that data is written in more phases. The lower pages and upper pages in a 4-level cell NAND flash memory can be categorized according to their write speeds, wherein lower pages which have faster write speed are also referred as fast pages, and upper pages which have slower write speed are also referred as slow pages. In some different NAND flash memories, the pages may also be categorized into fast, middle, and slow pages according to their write speeds. Namely, in a MLC flash memory, a block can contain pages having different write speeds, and these pages can be categorized into two, three, or even more groups according to their write speeds. The number of groups these pages can be categorized is determined according to the design of the memory.

Figure 5B:
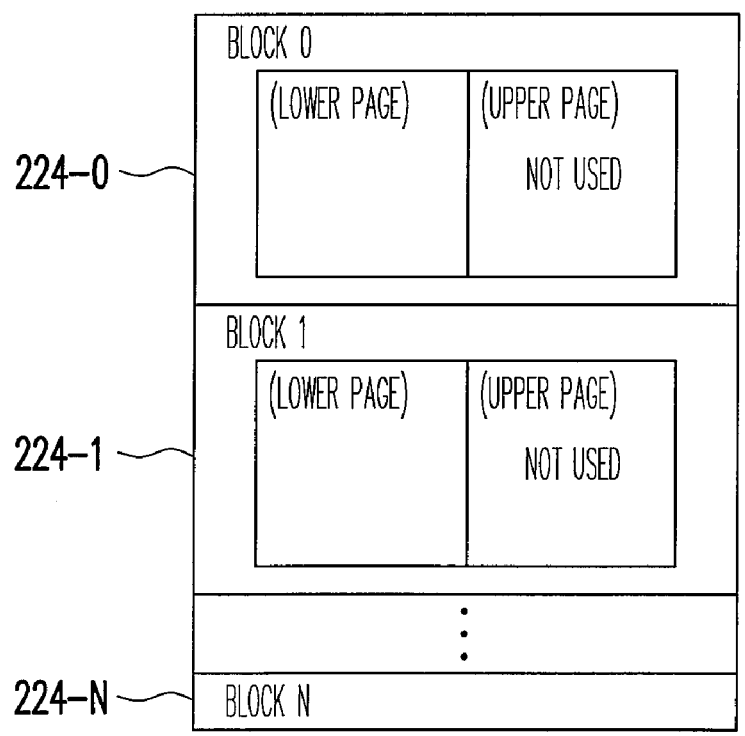
FIG. 5B illustrates a writing operation using only a lower page to write data according to an embodiment of the present invention.

In the present embodiment, in step S407, only pages in the temporary area 310 which have the fastest write speed or the highest reliability are used for writing data (as shown in FIG. 5B). Since the write speed of the lower pages is faster than that of the upper pages, by using only the lower pages for writing data, both the performance and the data reliability of the non-volatile memory storage device 220 can be greatly improved.

Additionally, without considering the write speed, in another embodiment of the present invention, one of a lower and an upper page in each block of the temporary area 310 may also be use for writing data. Namely, regarding each block in the temporary area, the upper page and the lower page both are used, or only the lower page is used. Accordingly, the data storage reliability of the non-volatile memory storage device 220 can be improved.

In another embodiment of the present invention, besides using only the lower pages in the blocks of the temporary area 310 for writing data, the data writing method for the non-volatile memory further includes using only the lower pages in the blocks of the system area 302 for writing system related data, such as a logical-physical mapping table, a cache file, a FAT, a firmware code, a defect block table (DBT) for recording defective blocks, a replace unit table (RUT) for managing defective blocks, an info block for storing firmware parameters, and a variable table (VT) for storing variables, so as to improve the reliability of the important system data and the performance of the entire system.

If only the lower pages of the blocks are used for writing data, a page query table is further established for recording the physical addresses of the lower pages in each block. To be specific, the physical addresses of upper pages and lower pages can be clearly specified according to the manufacturer's specification of each flash memory, so that the memory management module 222a in the controller 222 can use only the lower pages in the flash memory for writing data by establishing the page query table for recording the physical addresses of the lower pages. Additionally, in another embodiment of the present invention, a logic conversion formula may also be established according to the manufacturer's specification of each flash memory for calculating the physical address of the lower pages in each block. For example, assuming the addresses of the memory are as illustrated in FIG. 6, the memory management module 222a in the controller 222 uses only pages $2i$ in the memory, wherein i=0~63. However, the logic conversion formula may vary along with different flash memory.

Figure 7:
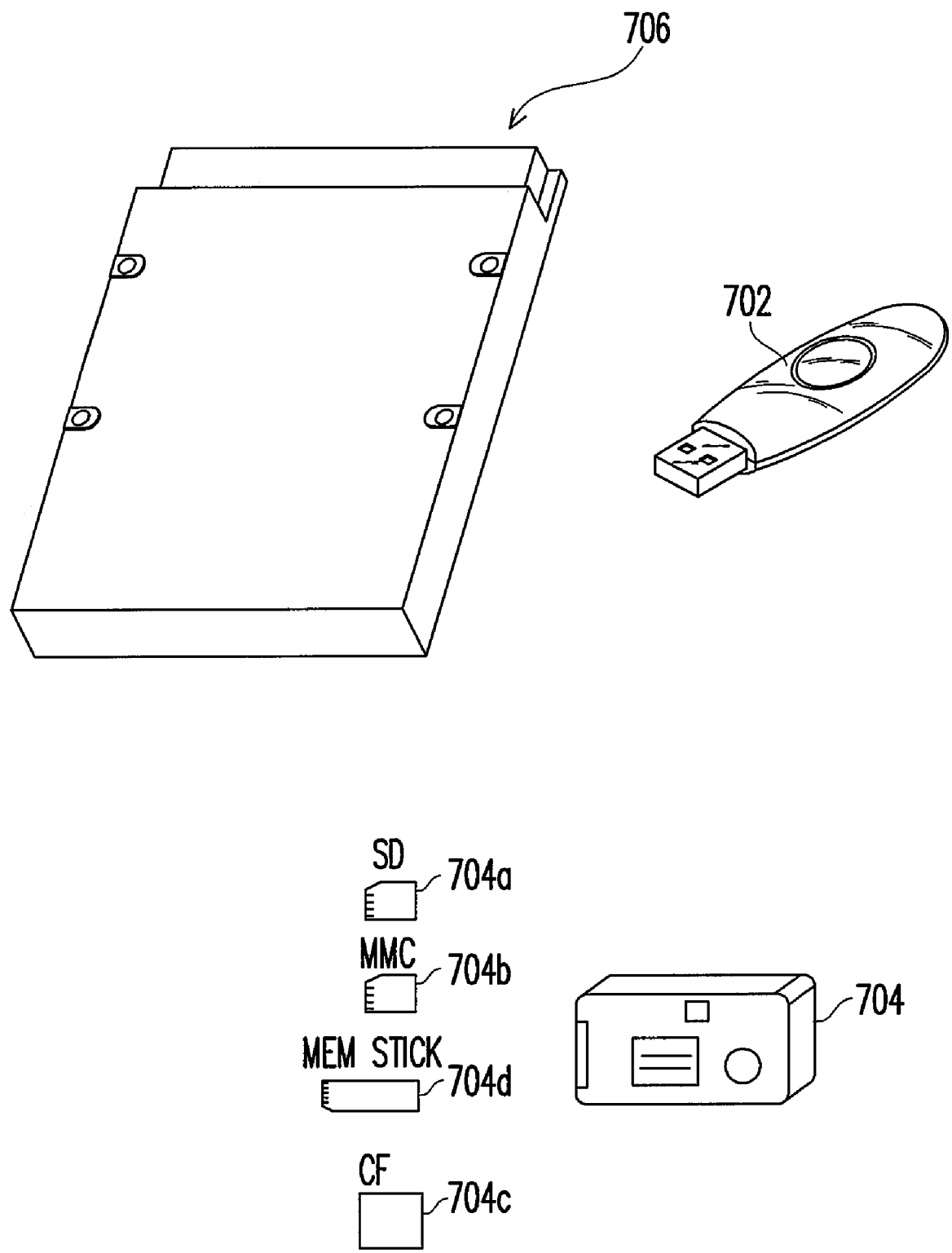
FIG. 7 illustrates various devices to which the data writing method for a non-volatile memory provided by the present invention can be applied.

The data writing method provided by the present invention is suitable for a non-volatile memory, and accordingly the data writing method provided by the present invention can be applied in any devices which use non-volatile memories as their storage media, such as the USB flash drive 702, the SD card 704a, MMC card 704b, CF card 704c, and memory stick 704d used by the digital camera (video camera) 704, and a SSD 706 illustrated in FIG. 7.

In overview, the present invention provides a data writing method for a non-volatile memory, wherein an integrated temporary area is used for temporarily storing data so that frequent data moving and erasing actions can be avoided and accordingly the efficiency in programming the non-volatile memory can be effectively improved. Moreover, data reliability of the non-volatile memory can be effectively improved by using only the lower page in a block for storing data.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method for a non-volatile memory, comprising:
respectively using a plurality of blocks belonging to a substitution area of the non-volatile memory for substituting a plurality of blocks belonging to a data area of the non-volatile memory to building a plurality of mother-child blocks sets, wherein each of the mother-child blocks sets includes one block belonging to the data area and one block belonging to the substitution area, and the blocks belonging to the substitution area are selected from a spare area of the non-volatile memory;
using a plurality of temporary blocks of the non-volatile memory as a temporary area for the plurality of mother-child blocks sets, wherein each of the temporary blocks does not independently belong to any one of the mother-child blocks sets,
receiving new data to be written into the blocks belonging to the data area;
determining whether the new data to be written is in a random mode;
writing the new data into the blocks belonging to the substitution area if the new data to be written is not in the random mode; and
writing the new data into the temporary blocks belonging to the temporary area if the new data to be written is in the random mode.

2. The data writing method according to claim 1, wherein the non-volatile memory comprises a replacement area, and at least one of the temporary blocks is selected from the replacement area.

3. The data writing method according to claim 1, wherein when the blocks belonging to the substitution area are attached right after where data is previously recorded for recording continuous write-back data, related data is written into the temporary area.

4. The data writing method according to claim 1 further comprising using a temporary table for indicating valid data and invalid data in the temporary area and a mapping relationship between pages in the temporary area and pages in the blocks belonging to the substitution area.

5. The data writing method according to claim 1, wherein if the flash memory is a MLC NAND flash memory, only lower pages in the temporary blocks are used for writing data into the temporary area, wherein the write speed of the lower pages is faster than the write speed of upper pages in the temporary blocks.

6. The data writing method according to claim 1, wherein if the flash memory is a MLC NAND flash memory, only the pages having the fastest write speed or highest reliability in the temporary blocks are used for writing data into the temporary area.

7. A controller, comprising:
a microprocessor unit, for controlling the operation of the controller;
a non-volatile memory interface, electrically connected to the microprocessor unit and used for accessing the non-volatile memory;
a buffer memory, electrically connected to the microprocessor unit and used for temporarily storing data; and
a memory management module, electrically connected to the microprocessor unit and used for managing the non-volatile memory,
wherein the memory management module respectively uses a plurality of blocks belonging to a substitution area of the non-volatile memory for substituting a plurality of blocks belonging to a data area of the non-volatile memory to building a plurality of mother-child blocks sets, wherein each of the mother-child blocks sets includes one block belonging to the data area and one block belonging to the substitution area, and the blocks belonging to the substitution area are selected from a spare area of the non-volatile memory, and
wherein the memory management module uses a plurality of temporary blocks of the non-volatile memory as a temporary area for the plurality of mother-child blocks sets, wherein each of the temporary blocks does not independently belong to any one of the mother-child blocks sets, wherein the memory management module receives new data to be written into the blocks belonging to the data area, and the memory management module further determines whether the new data to be written is in a random mode, wherein the memory management module writes the new data into the blocks belonging to the substitution area if the new data to be written is not in the random mode, and wherein the memory management module writes the new data into the temporary blocks belonging to the temporary area if the new data to be written is in the random mode.

8. The controller according to claim 7, wherein the non-volatile memory comprises a replacement area, and at least one of the temporary blocks is selected from the replacement area.

9. The controller according to claim 8, wherein the memory management module uses a temporary table for indicating valid data and invalid data in the temporary area and a mapping relationship between pages in the temporary area and pages in the blocks belonging to the substitution area.

10. The controller according to claim 1, wherein when the blocks belonging to the substitution area are attached right after where data is previously recorded for recording continuous write-back data, related data is written into the temporary area.

11. The controller according to claim 7, wherein the non-volatile memory is a SLC NAND flash memory or a MLC NAND flash memory.

12. The controller according to claim 11, wherein if the flash memory is the MLC NAND flash memory, the memory management module only uses lower pages in the temporary blocks for writing data into the temporary area, wherein the write speed of the lower pages is faster than the write speed of upper pages in the temporary blocks.

* * * * *